United States Patent [19]

Hobbs

[11] 4,179,657

[45] Dec. 18, 1979

[54] ANTI-JAMMING COMMUNICATION SYSTEM

[75] Inventor: Charles F. Hobbs, Medford, Mass.

[73] Assignee: The United States of America as represented by the Secretary of the Air Force, Washington, D.C.

[21] Appl. No.: 757,885

[22] Filed: Aug. 28, 1958

[51] Int. Cl.[2] .......... H04K 1/00; H04L 9/00

[52] U.S. Cl. .......... 325/33; 178/22

[58] Field of Search .......... 179/15 AS; 325/33; 178/22, 5.1

[56] References Cited

U.S. PATENT DOCUMENTS

| | | | |
|---|---|---|---|
| 2,510,338 | 6/1950 | Guanella | 250/6.6 X |
| 2,517,587 | 8/1950 | Mohr | 250/6.6 X |
| 2,709,218 | 5/1955 | Gabrilovitch | 250/6.6 X |
| 2,720,557 | 10/1955 | Goodall | 178/43.5 |
| 2,923,764 | 2/1960 | Druz et al. | 178/5.1 |
| 2,952,735 | 9/1960 | Weiss | 250/6.6 |

*Primary Examiner*—S. C. Buczinski

*Attorney, Agent, or Firm*—Joseph E. Rusz; George Fine

EXEMPLARY CLAIM

1. A system of communications to an intended destination in a manner to elude detection by unauthorized sources, and to prevent jamming, which comprises multi-channel transmitting means, each of said channel transmitting means having a different frequency and delay, said frequency and delay being variable, means to generate time and address digits, means to encipher said time and address digits, means to initially set the frequencies and delays in each of said transmitting channels, said setting means receiving said enciphered time and address digits, means to convert a message to be transmitted into digital bits, means to encipher said message digital bits, means for multiple transmission of the initial message digital bit after said setting of channels, and means to successively reset the frequency and delay in each of said transmitting channels after said multiple transmission of said first message digital bit, said resetting means receiving successive enciphered message digital bits until said message is completely transmitted.

6 Claims, 9 Drawing Figures

ANTI-JAMMING COMMUNICATION SYSTEM

The invention described herein may be manufactured and used by or for the United States Government for governmental purposes without payment to me of any royalty thereon.

This invention relates to a radio communication system and particularly to methods of protecting the secrecy of communications and from deliberate attempts to destroy the intelligence therein by introduction of interference.

An object of the invention is to provide means by which one or more operating parameters, or characteristics, of a communication system can be changed at intervals frequent enough to maintain secrecy and so that it will be impossible for a would-be jammer to use optimum "spot" jamming techniques.

Another object of the invention is to provide secure and untrackable means by which changes in parameters and/or characteristics of the communication system can be made at appropriate times at both the transmitter and the receiver without the jammer being able to anticipate the exact nature of such changes.

Still another object of the present invention is to maintain communications with a high degree of reliability during attempts to jam the system by barrage jamming or random spot jamming and to provide means for restoring communications when they have been disrupted for any reason; and to provide this facility without appreciably curtailing existing communications in the frequency spectrum utilized for the implementation of the invention.

Yet another object of the present invention is to provide for redundant transmission of digital information on several channels, each of which are dodging in a pseudo-random and apparently unrelated manner over a relatively large frequency-time message space.

A further object of the present invention is to provide the inherent reliability of time synchronization with the high information rate capability of message directed dodging over the frequency-time message space.

These objects, together with other objects which will be apparent later are realized in a system using cryptographic encoding of a digital representation of time to establish synchronism between transmitter and receiver; cryptographic encoding of message digits to maintain synchronism, multiple transmission of messages, with or without integration at the receiver, to increase reliability of message transmission; and change in location of message units in the frequency-time message space in a psuedo-random manner. Such a system is inherently more flexible and more reliable than a single channel system utilizing time synchronization only for dodging in the frequency-time message space.

If communication are to be maintained in the presence of deliberate attempts to jam, the communications transmitter must be capable of putting more energy into the receiver than the jammer. If the jammer knows the frequency and time of a pulse code amplitude modulated signal, for instance, and puts all his energy into a few pulses, he has a high probability of replacing one or more zeros of the signal by ones and upon decoding the result, the wrong message is obtained at the receiver. Use of high power transmitters and directive antennae will help to overcome this type of jamming but in military operations, it often happens that the jammer may be in relatively close proximity to the receiver compared with the communication transmitter and any possible power advantage of the communication transmitter and directive antenna is easily overcome. The result may be that communications are disrupted at a particularly vital point in a military mission such as close control interception of an enemy bomber. In addition to these disadvantages a very high power transmitter and directive antenna installation is very costly and not suited to mobile and airborne military operations.

One way of increasing the probability of jamming is to use a large frequency-time message space and concentrate small message units in one element of the space, then, before spot jamming can be placed on this element, to jump or dodge to another element. The dodging may be done at regular or irregular intervals of time but the dodging in frequency must be irregular so that it appears random to the jammer. This technique will force the enemy to adopt the less efficient barrage jamming technique or to attempt to "outguess" the communicators.

The main problem in implementing a frequency-time dodging scheme is to keep the receiver informed of where and when each succeeding message unit will occur without informing the jammer of this also. Methods depending on time synchronism only have been investigated thoroughly and it has been found that the theoretical performance of such a system is limited by synchronization errors arising from propagation path time differences. This invention uses time synchronism to establish or re-establish communications but the bulk of the communicating is done while the signal is dodging from message element to message element in a manner determined by the cryptographic encipherment of successive message elements. Multiple transmission of each message element with integration at the receiver may be used to increase the reliability of the system and hence to increase its rate of information transferal for a given degree of synchronization.

To overcome repeater type jamming, it is necessary, from a theoretical point of view, to stay in the same position in the frequency spectrum only for a time interval which is equal to or less than the difference in propagation time from the transmitter to the receiver by way of the direct path and by way of the jammer position. In the worst case, for pulse communication, the position in the frequency spectrum would have to be different for each succeeding pulse. Practical repeater jammers may be expected to be capable of repeating on only a finite number of frequency channels simultaneously. Hence, if the communication transmitter uses more than this number of frequency channels it will be impossible for the jammer to jam all of the channels. The probability of a repeater jamming a specific channel or group of channels can be reduced to practical levels by transmitting dummy signals on a number of additional frequency channels for deception purposes. This invention provides alternatively for changing frequency as often as necessary to avoid repeat jamming or for the transmission of deception signals to defeat such jamming.

The invention will be more fully understood by reference to the figures which are used for illustrative purposes.

Figure 1:
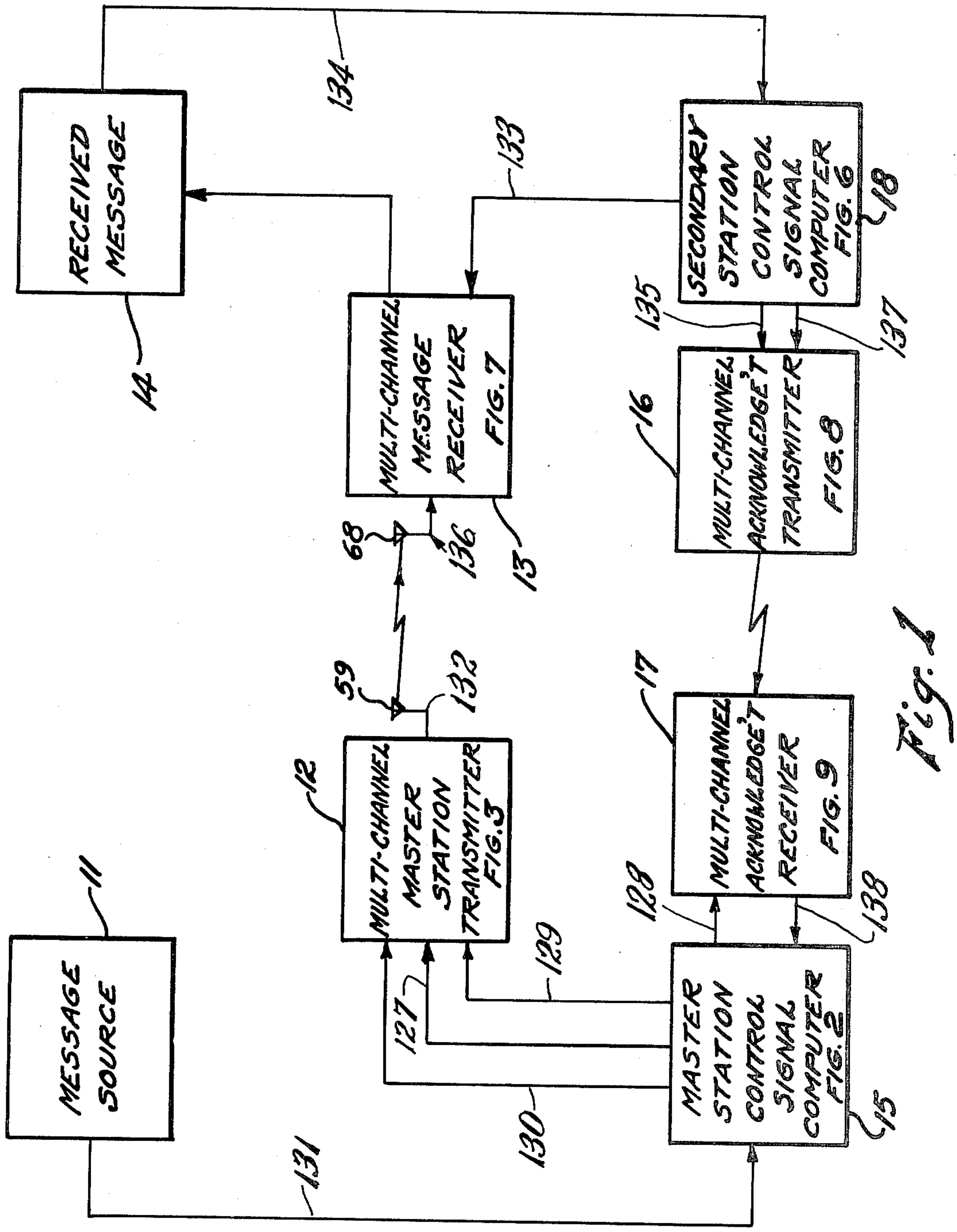
FIG. 1 is a block diagram of a jam resistant communication system.

A pair of stations illustrative of the invention are shown in FIG. 1. The system consists of a master station from which messages are sent to one or more secondary stations. Message source 11 is located at the master station which furnishes binary digits to multi-channel-master-station transmitter 12 for transmission to multi-channel message receiver 13 of a secondary station. The frequency and/or time delay of each of the several transmitter channels is controlled by master-station-control-signal computer 15 and the several receiver channels of multi-channel message receiver 13 are kept in step with the corresponding transmitter channels by means of secondary station control signal computer 18. The system can be designed to change all channel frequencies and delays after the transmission of a single message digit or a group of message digits. Upon the successful reception of a message of predetermined length, the secondary station transmits a multi-channel acknowledgement signal by means of multi-channel acknowledgement transmitter 16. This multi-channel acknowledgement is received at the master station on multi-channel-acknowledgement receiver 17. The channels used for acknowledgement dodge in frequency in response to control signals furnished by computer 15 and computer 18 also.

Figure 2:
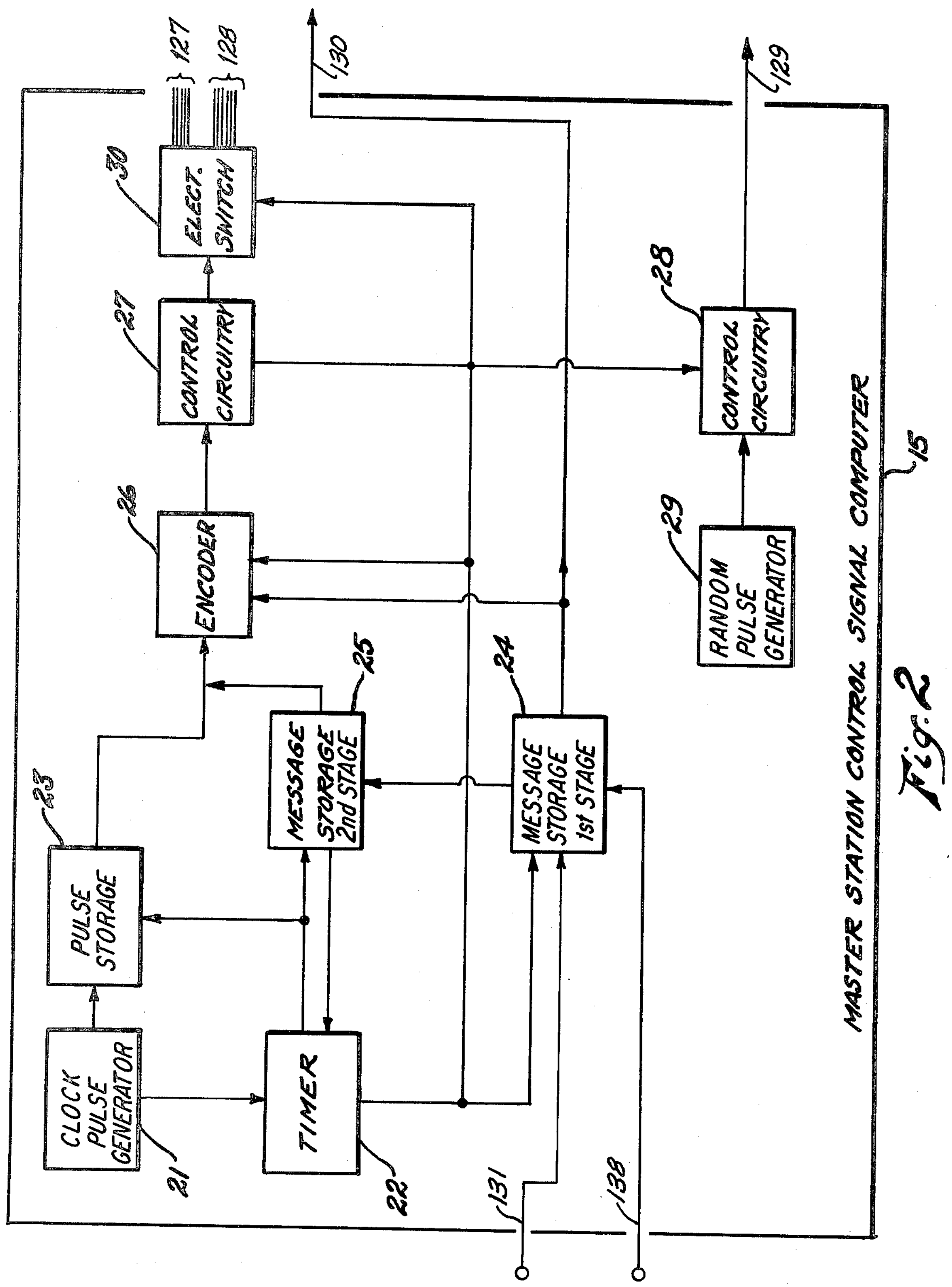
FIG. 2 is a block diagram showing the master station control signal computer.

FIG. 2 is a block diagram of master station control signal computer 15 used with a multi-channel-time-division-multiplex transmitter-receiver 17. Clock pulse generator 21 has an accuracy of approximately ±0.2 sec over a 24 hour period. At the beginning of each one second interval of time, the clock produces a synchronizing pulse, which is transmitted to timer 22 in the fashion of the operation of the synchronizing pulse circuit 152 illustrated in FIG. 1 of U.S. Pat. No. 2,616,965 to C. H. Hoeppner. Thereupon there is produced by way of the output line to storage device 23 a series of sixteen binary digits identifying the particular 1 second interval. These latter pulses are stored in time storage or pulse storage element 23. Pulse storage element 23 maybe of the type shown and described in U.S. Pat. No. 2,652,501 to V. C. Wilson wherein such storage devices are illustrated at 18, 19 and 20 of the Wilson patent FIG. 4, in which case timer 22 output line would correspond to the actuating line 16 of Wilson's FIG. 4 and the line from clock pulse generator 21 would correspond to the signal transmission line 12*c*-13*c*-14*c* of Wilson's FIG. 4 and wherein the output line from pulse storage device 23 would correspond to the signal output lines 22, 24, 26 and 28 of Wilson's FIG. 4.

A message to be sent by the master station transmitter is preceded by its address. Both address and message digits are stored in first stage message storage element 24 first stage message storage element 24 is of the same type of pulse storage as described for pulse storage element 23. From storage element 24 the address is applied to the second stage message storage element 25. In storage element 25 a search is made to determine whether or not a message is stored under the appropriate address label. A signal is then transmitted from storage element 25 to timer 22, indicating the presence or absence of a stored message. If a message is present in storage element 25, timer 22 immediately initiates action to encipher that message in crypto box or encoder 26. Encoder 26 may be of the type shown and described in U.S. Pat. No. 2,834,011 to R. P. Mark in which case the lines from devices 23, 24 and 25 would supply keying pulses and input voltages to be coded to devices corresponding to inverter 13, and the variable delay circuit 12 illustrated in FIG. 1 of the said Mark's patent. The several outputs from Encoder 26 corresponding to the several outputs illustrated at 31 to 35 in FIG. 1 of the said Mark patent, are used to determine frequency settings and delays for the master transmitter, FIG. 3, by use of the control circuitry 27 corresponding to the pulse code modulating circuitry illustrated in detail in FIG. 1 of U.S. Pat. No. 2,520,125 to A. G. Clavier. Simultaneously another control circuitry unit 28 of the said Clavier patent (FIG. 1) type may be used to tune up other channels of the transmitter for transmission of "dummy" or fake messages for confusion purposes in response to random digit inputs from random pulse generator 29, random pulse generator 29 is comprised of any conventional pulse generator triggered by a conventional noise signal source so that the output signal therefrom consists of a sequence of pulses whose polarity is equally probable, the operation being like that illustrated in FIG. 1 of U.S. Pat. No. 2,652,502 to W. S. Melville et al and described in the Melville patent specification at column 2, lines 36–54 inclusive wherein such a noise signal-produced pulse generator is indicated at 10-14-11 in FIG. 1 of the drawings of the said Melville patent. As soon as transmitter 12 is tuned up, timer 22 causes one or more message digits to be read out of first stage message storage element 24. These message digits are applied simultaneously as modulation to the master transmitter, FIG. 3, and to Encoder 26 which has not been reset as yet. After the one or more digits have been transmitted, the timer causes the transmitter message frequencies and delays to be returned by control circuitry 27 in response to the new control signals now available from Encoder 26. Simultaneously the control circuitry 28 retunes the dummy transmitter channels. The transmission of one or more digits followed by retuning of the transmitter channels is repeated until the complete message has been sent. At this time, timer 22 causes electronic switch 30 to switch the control signals from control circuitry 27 to acknowledgement receiver 17, FIG. 9, which then awaits the signal from the addressed station that will acknowledge receipt of the message. Electronic switch 30 is conventional and is shown and described in U.S. Pat. No. 2,402,059 to J. F. Craib and corresponds to electronic switch 49' of FIG. 3 of said patent to Craib. Returning to message storage element 25, if a message labeled with the called station's address is not found, timer 22 waits a fraction of a second and then causes the 16 time digits to be fed from pulse storage 23 into Encoder 26. The reason for the delay will be explained below making reference to FIG. 4. As soon as the 16 time digits have been loaded into Encoder 26, the 16 address digits follow. At the completion of the encipherment of these 32 digits, control circuitry 27 establishes the initial frequency settings and delays for the transmitter of FIG. 3. After the transmission of the initial message digit, or digits, has taken place, the dodging in frequency and delay time is accomplished as previously explained.

Figure 9:
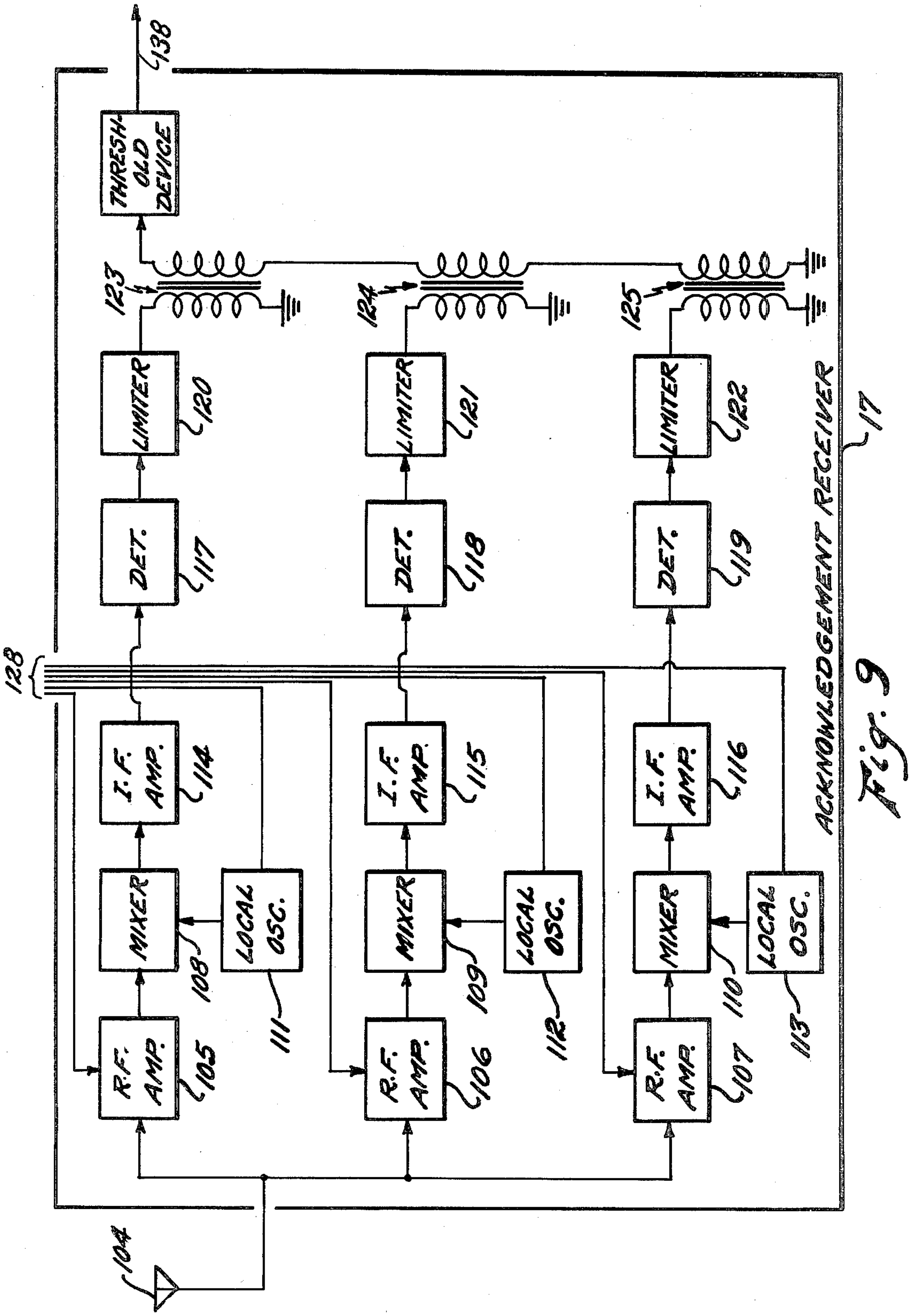
FIG. 9 shows a block diagram of the acknowledgement receiver.

After the message transmission has been completed and the acknowledgement receiver 17 of FIG. 9 has been tuned up to await the acknowledgement signal, the control circuitry and the transmitter are available to handle messages addressed to other stations. It is necessary to have additional message storage elements such as element 24 to handle the several messages in process, i.e., awaiting acknowledgement of receipt of message from the addressed station.

Upon receipt of the acknowledgement from the receiver of FIG. 9, the message, receipt of which is acknowledged, is transferred from first stage message storage element 24 to message storage element 25 where it is stored under the appropriate address to await the next identical address requesting read out to Encoder 26.

In order to avoid storage of messages addressed to secondary stations with which the matter station is no longer in communication, provision is made to erase each message after it has been stored a certain length of time. For example, if five seconds is established as this maximum time, the timer will cause the message to be erased five seconds after it is stored unless it has been transferred to Encoder 26 in the meantime. If a new message is addressed to a secondary station after the previous message has been erased, the computer uses pulse signals stored in storage element 23 to establish contact with the addressed station as outlined above.

Figure 4:
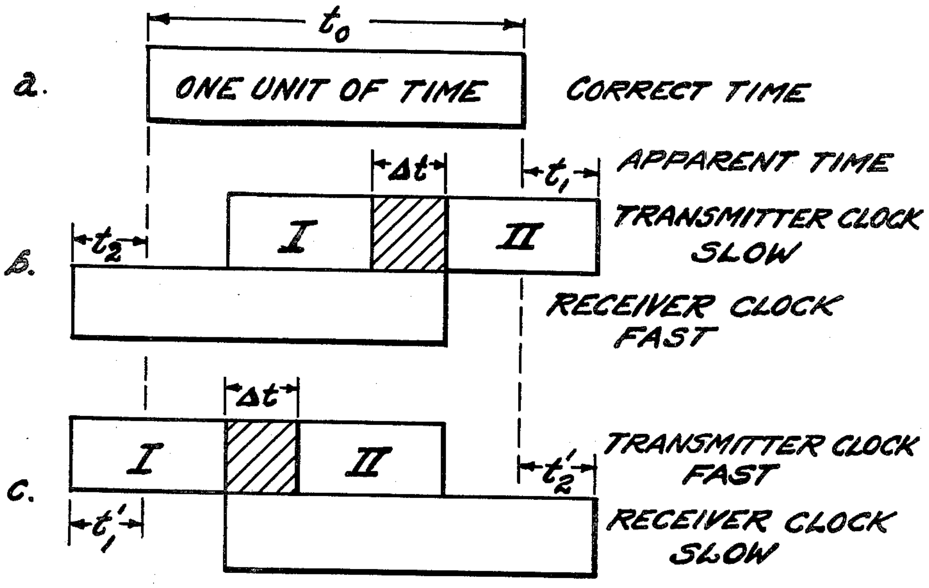
FIG. 4 is a chart of time relationships resulting from timing irregularities inherent in the pulse propagating "clock" circuitry.

Refer now to FIG. 4. At "a" we see a block representing a particular unit of time $t_0$ in length. Assume that the transmitter clock may run a maximum of $t_1$ seconds slow or $t_1'$ seconds slow or $t_1'$ seconds fast in a 24 hour period and that the receiver clock may run a maximum of $t_2$ seconds fast or $t_2'$ seconds slow. Then the worst conditions are shown at b and c. It is seen that it is only during the interval $\Delta t$, as observed at the transmitter clock, that both the transmitter and receiver clocks 21 and 60 of FIGS. 2 and 6 respectively always indicate the same time. If transmission is attempted in interval I, as seen at c, the receiver will not be properly tuned if the transmitter clock is fast and the receiver clock is slow; and if transmission is attempted in interval II, as seen at b, the receiver will not be properly tuned if the transmitter clock is slow and the receiver clock is fast.

From FIG. 4, it is apparent that insuring the existence of a finite time $\Delta t$ in which both transmitter and receiver clocks agree requires that $t_0 > 2t_1 + 2t_2$ and $t_0 > 2t_1' + 2t_2'$. If $t_1 = t_1' = t_2 = {}_2'$, then $t_1 < t_0/4$ is the requirement for $\Delta t$ to exist. Thus, if the unit of time is one second and clocks having an accuracy of $\pm 0.2$ seconds are used, then $\Delta t = 0.2$ seconds.

Figure 3:
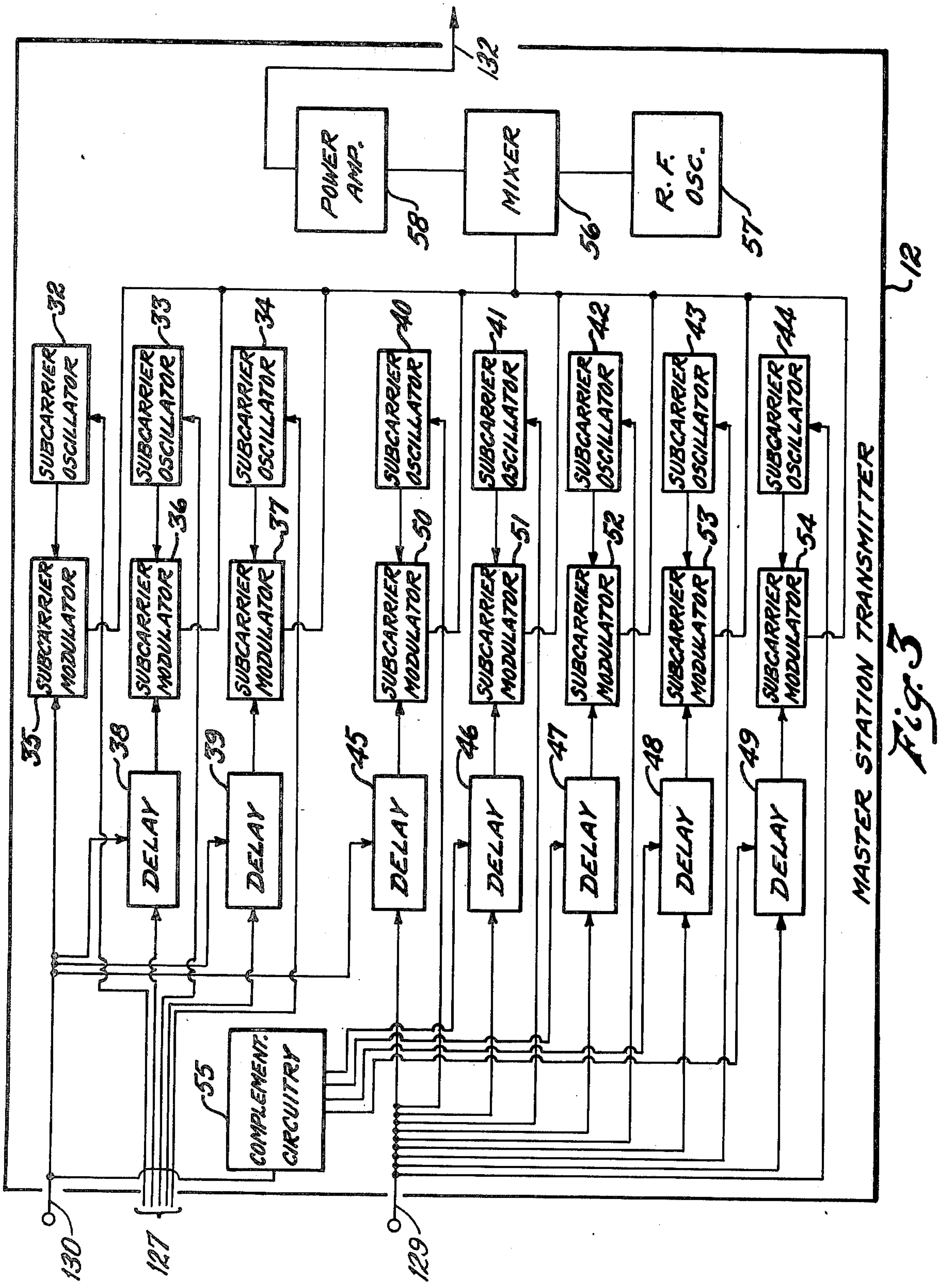
FIG. 3 is a block diagram illustration of the master station transmitter.

As shown in FIG. 3, during transmission the control signals supplied by the computer of FIG. 2 determine the delays and frequencies associated with each of the message channels A, B, and C and the several dummy channels. Electronic switch 30 furnishes frequency control signals to message subcarrier oscillators 32, 33 and 34, which furnish oscillations to subcarrier modulators 35, 36 and 37 respectively. The electronic switch 30 also furnishes signals which control the amount of delay introduced by the delay circuits 38 and 39 respectively.

Control circuitry 28 furnishes frequency control signals to the dummy channel subcarrier oscillators 40, 41, 42, 43 and 44, and delay control signals to blocks 45, 46, 47, 48 and 49 respectively.

In the subcarrier modulators 35, 36, 37 and 50, the message digits furnished by message source 11 are used to pulse modulate the subcarrier oscillations furnished by oscillators 32, 33, 34 and 40 respectively. The message digits applied to modulators 36, 37 and 50 are delayed by time delays 38, 39 and 45 respectively. In subcarrier modulators 51, 52, 53 and 54, the complement of the message digits, as furnished by the message source 11 through complementing circuitry 55, is used to pulse modulate the subcarrier oscillations furnished by subcarrier oscillators 41, 42, 43 and 44 respectively. The complemented signals are delayed by time delays 41, 42, 43 and 44 respectively. Thus in any particular element of time such as shown in I of FIG. 5, one half of the selected channels will be transmitting pulses (ones) and the other half will not. This insures a constant duty cycle for the transmitter. It also provides message security because pulses are being transmitted on the same number of channels regardless of whether a one or a zero digit is being sent.

In mixer 56, the combined outputs of the subcarrier modulators are heterodyned with the radio frequency oscillations furnished by radio frequency oscillator 57 to obtain the final channel frequencies which are amplified in power amplifier 58 and radiated by the transmitting antenna, circuit element 59.

Figure 5:
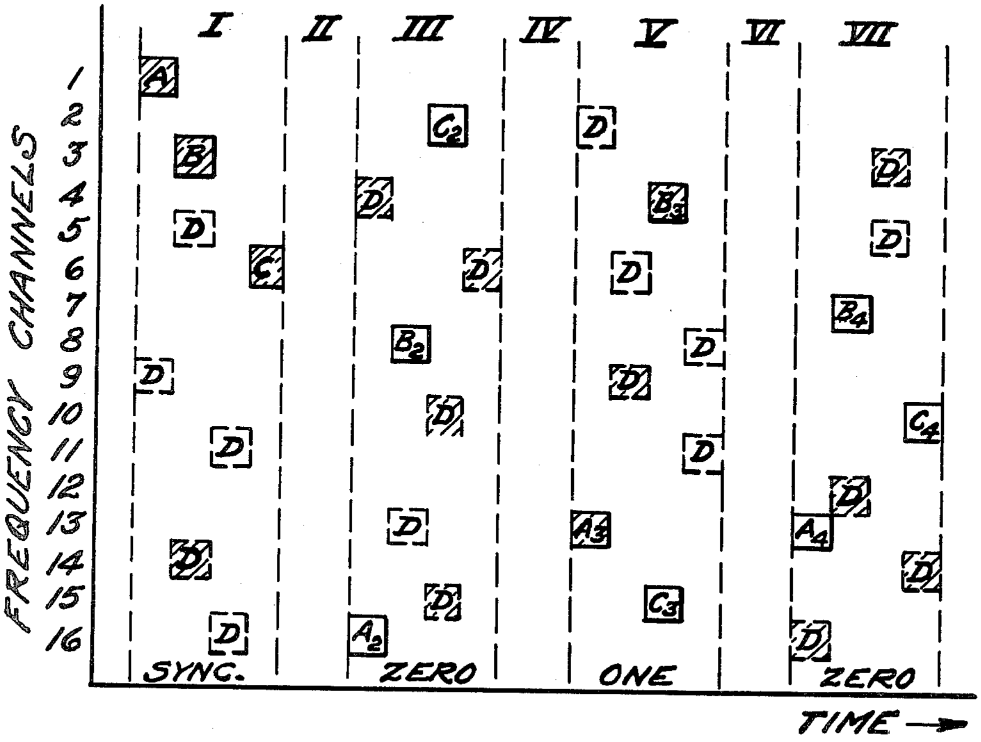
FIG. 5 is a plot showing frequency-time relationships in terms of message space units.
Figure 7:
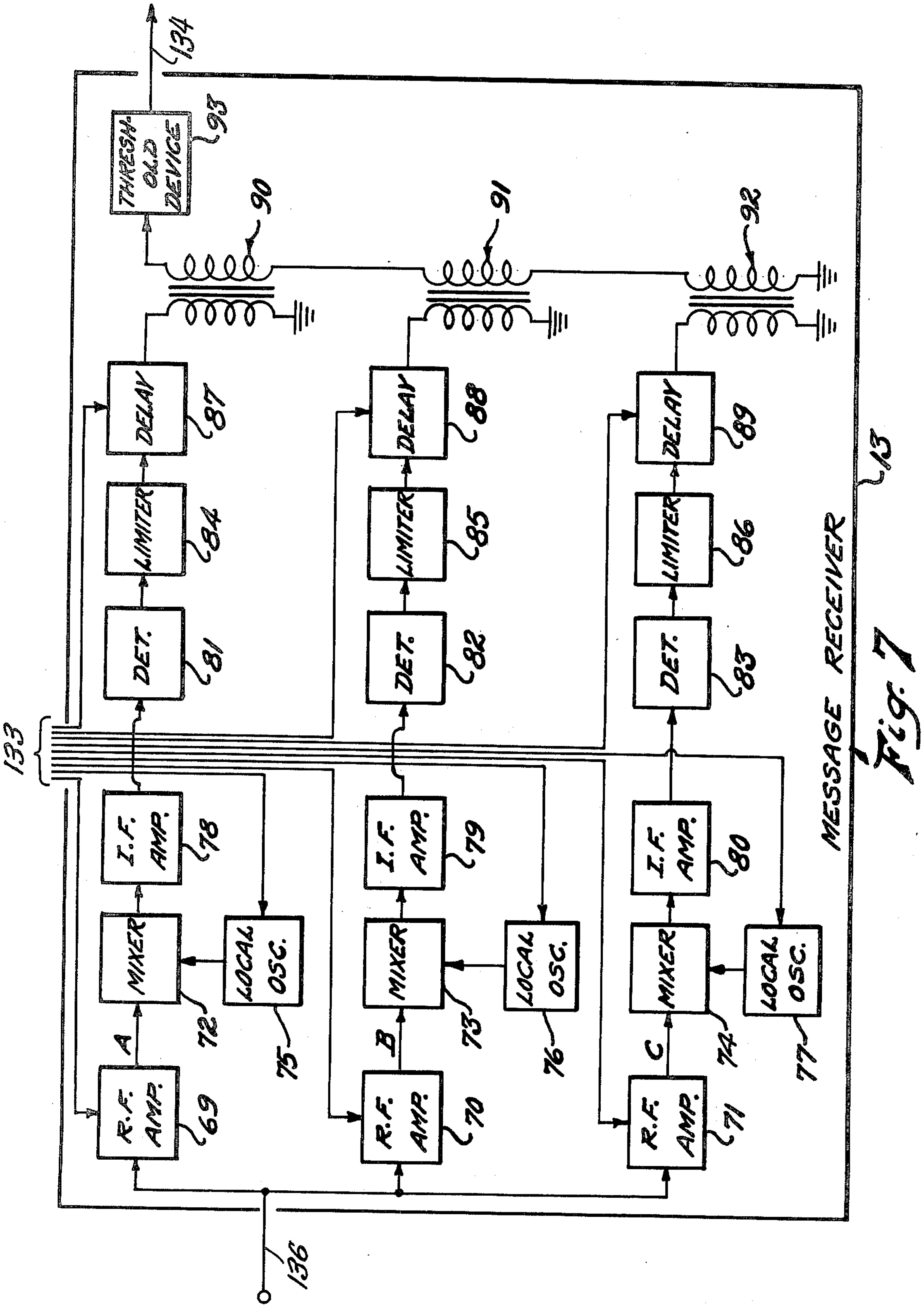
FIG. 7 shows a block diagram of the message receiver.

FIG. 5 is illustrative of the frequency and timing sequence that is used in the invention described herein. During the first interval I, a synchronizing pulse is transmitted on channels 1, 3 and 6. Delays are as indicated. Assume a dummy transmission on channel 14 also. During interval II no transmission occurs while the transmitter of FIG. 3 and receiver of FIG. 7 are being returned. Assume that the first message digit to be transmitted from the multi-channel master station 12 of FIG. 1 is zero. Then pulses will be transmitted on four dummy channels only during interval III, e.g., channels 4, 6, 10 and 15 with delays as shown. If the first message digit had been a one, pulses would be transmitted on channels 2, 8, 13 and 16 with delays as shown. Again during interval IV, the transmitter and receiver are retuned. During interval V a one is transmitted, during interval IV the transmitter and receiver are retuned again, and during interval VII a zero is transmitted.

Figure 6:
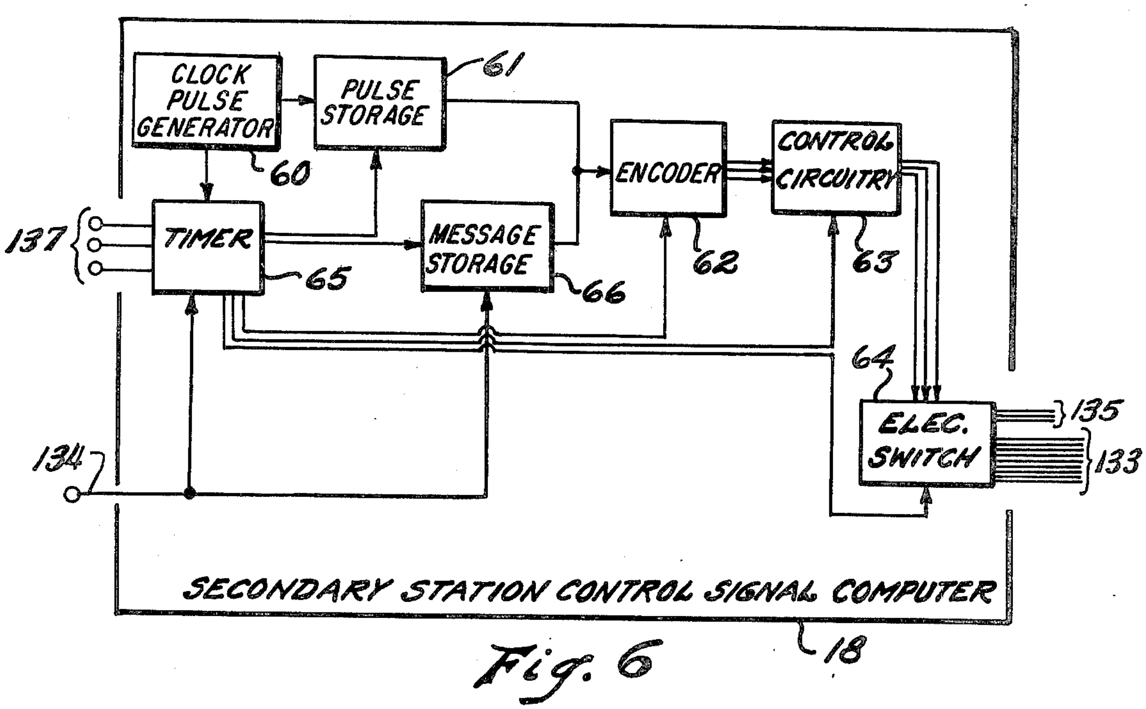
FIG. 6 shows a block diagram of the secondary station control signal computer.

At the secondary station of FIG. 1, receiver 13 is tuned to receive any message addressed to it. The control signal computer for a secondary station is shown in FIG. 6. Its operation is as follows. The sixteen digit binary representation of time furnished by clock pulse generator 60 is stored in pulse storage element 61, pulse storage element 61 is of the same type as described for pulse storage element 23. At the beginning of each one second interval, this sixteen digit number changes. When the secondary station is not in communication with a master station, a new set of control signals are generated at the beginning of each one-second interval. The sixteen digit number representing time followed by the sixteen digit address is enciphered by Encoder 62, Encoder 62 is of the same type as described for Encoder 26, which then furnishes the desired number of binary digital control numbers to control circuitry 63 where they are converted to the appropriate control signals for tuning the receiver. These signals are applied to the receiver through electronic switch 64. Timer 65 furnishes the appropriate triggering pulses to elements 61, 62, 63 and 64 to accomplish the above operations.

Upon the receipt of a triggering pulse from receiver 67 of FIG. 7, timer 65 initiates the appropriate triggering pulses to cause the received pulse and each succeeding pulse received immediately thereafter to be used to shift the control signals for the receiver in synchronism with those of the master station transmitter. Each digit as it is received is stored in the message storage element 66. During receipt of the rest of the message, the message digits already received are read into Encoder 62 as necessary to maintain synchronism of the receiver with the transmitter. During this time the digits are not erased from the storage register 66.

Figure 8:
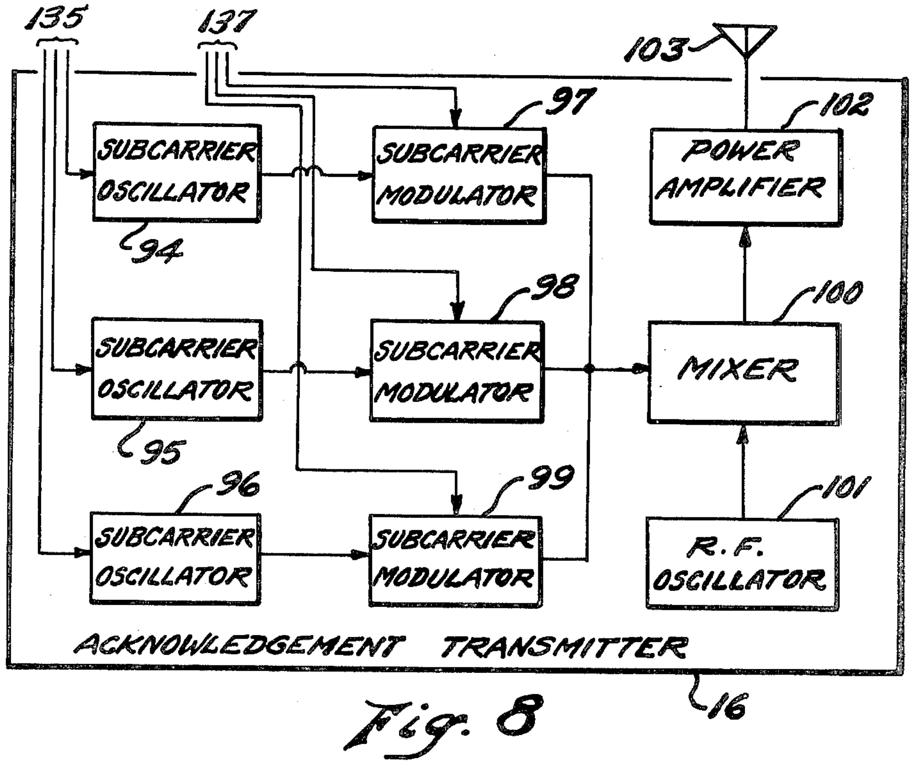
FIG. 8 shows a block diagram of the acknowledgement transmitter.

At the end of each message timer 65 causes the electronic switch 64 to switch the control signals to transmitter 16 of FIG. 8 and after the transmission of an acknowledgement, the following sequence of events occurs: Encoder 62 is zeroed; the contents of message storage register 66 are emptied into Encoder 62; encipherment of the message digits occurs in the Encoder; control signals resulting from the encipherment are generated in the control circuitry 63; the control signals are applied to the receiver, FIG. 7, through the electronic switch 64. The receiver now awaits new message signals to be transmitted on the appropriate channels.

In the event that a message or acknowledgement is missed for any reason, contact between the master station and the secondary station is broken. Provision is made for a return to the time determined control signals upon failure to receive a new message within a predetermined time after the previous message. This time might be of the order of five seconds. After this time has elapsed and no new message is received, Encoder 62 is reset to zero, the contents of the pulse storage element 64 are read into it, and the appropriate control signals are computed and applied to the receiver. Since this is also done at the master transmitter, FIG. 3, when an acknowledgement is not received within the specified time, conditions are now appropriate for re-establishing contact the next time the master transmitter has a message for this particular secondary station. If a message is not received before the end of the particular one second interval specified by the time digits taken from storage, a new set of control signals are generated, i.e., the Encoder is zeroed and the new time digits and address are enciphered by it. This returning of the message receiver is repeated at the beginning of each second as long as the secondary station is on a standby basis.

Referring to FIG. 7, the receiving antenna, circuit element 68, intercepts the radio wave emitted by transmitting antenna, circuit element 59 of FIG. 3. The particular channels being used, A, B, and C, are selected by radio frequency amplifiers 69, 70 and 71 respectively. The incoming message signals are converted to intermediate frequency signals in mixers 72, 73 and 74, by heterodyning with local oscillator signals furnished by local oscillators 75, 76 and 77. The intermediate frequency signals are amplified by intermediate amplifiers 78, 79 and 80, and are converted to video pulses by detectors 81, 82 and 83. The amplitudes of the pulses produced by the several channels are limited by limiters 84, 85 and 86. Delays are introduced in each of the channels by delay circuits 87, 88 and 89. The delays are such that message pulses in the several channels are made coincident and these coincident pulses are added by appropriate circuitry such as pulse transformers, circuit elements 90, 91 and 92. The sum of the outputs of the several channels is passed through a threshold device 93 which produces an output whenever a predetermined threshold is exceeded.

The control signals applied to the receiver through the electronic switch 64 of FIG. 6, tunes the radio frequency amplifiers 69, 70 and 71; local oscillators 75, 76 and 77; and delay circuits 87, 88 and 89. This tuning is accomplished between message elements to keep the several receivers tuned to receive the message signals transmitted by the master station transmitter of FIG. 3.

Refer now to the block diagram of the acknowledgement transmitter shown in FIG. 8. When a message of predetermined length has been successfully received, electronic switch 64 of FIG. 6, connects the appropriate control signals to subcarrier oscillators 94, 95 and 96, in response to a triggering signal received from timer 65 of FIG. 6. Following this, the timer furnishes a modulation pulse to subcarrier modulators 97, 98 and 99, which modulates the subcarrier oscillations furnished by oscillators 94, 95 and 96 respectively. The outputs of the several subcarrier modulators are combined at the outputs of the modulators to form a frequency division multiplexed signal which is heterodyned in mixer 100 with radio frequency oscillator 101 to form a multichannel radio frequency pulse. This multi-channel signal is amplified by power amplifier 102 and radiated by antenna 103.

Refer now to FIG. 9. The acknowledgement signal transmitted from the antenna 103, of FIG. 8, is collected by antenna 104, at the master station. The several channels are separated by radio frequency amplifiers 105, 106 and 107, and are heterodyned down to intermediate frequency signals in mixers 108, 109 and 110 by heating with local oscillator signals furnished by oscillators 111, 112 and 113 respectively. After amplification in intermediate frequency amplifiers 114, 115 and 116, the intermediate frequency signals are detected in detectors 117, 118 and 119 respectively, following which the resultant pulses are limited in limiters 111, 112 and 113. The limited outputs of the limiters are added linearly in a circuit such as the three pulse transformers 123, 124, and 125, having their secondaries in series. The resultant of this summation is used as input to a threshold device 126 and if a predetermined threshold is exceeded, an output is obtained which is used to transfer the message digits from first stage storage element 24 of FIG. 2 to the permanent message storage element 25.

In the practical embodiment of the invention, several frequency channels are occupied simultaneously but for only very brief intervals of time so that only a relatively small amount of interference would be experienced on existing communication facilities. Protection against spot jamming is afforded by dodging over a wide frequency range with each of the several channels.

Thus the invention provides for redundant transmission of digital information on several channels, each of which are dodging in a psuedo-random and apparently unrelated manner over a relatively large frequency-time message space. It combines the inherent reliability of time synchronization with the high information rate capability of message directed dodging over the frequency-time message space.

Since there is only a small probability of two or more secondary stations being tuned to the same combination of channels at the same time, it is not necessary to transmit the address digits. They are used only to select the proper channels at the master station. In addition to making more capacity available for transmitting message digits, this feature increases the difficulty of any possible analyst since it is not known to which secondary station a given transmission is being directed.

It will be understood that certain features and sub-combinations are of utility and may be employed without reference to other features and sub-combinations. This is contemplated by and within the scope of the claims. It is further obvious that various changes may be made in details within the scope of the claims without departing from the spirit of the invention. It is, therefore, to be understood that this invention is not to be limited to the specific details shown and described.

What is claimed is:

1. A system of communications to an intended destination in a manner to elude detection by unauthorized sources, and to prevent jamming, which comprises multi-channel transmitting means, each of said channel and transmitting means having a different frequency and delay, said frequency and delay being variable, means to generate time and address digits, means to encipher said time and address digits, means to initially set the frequencies and delays in each of said transmitting channels, said setting means receiving said enciphered time and address digits, means to convert a message to be transmitted into digital bits, means to encipher said message digital bits, means for multiple transmission of the initial message digital bit after said setting of channels, and means to successively reset the frequency and delay in each of said transmitting channels after said multiple transmission of said first message digital bit, said resetting means receiving successive enciphered message digital bits until said message is completely transmitted.

2. A system of communications to an intended destination in a manner to elude detection by unauthorized sources, and to prevent jamming, which comprises multi-channel transmitting means, each of said channel transmitting means having a different frequency and delay, said frequency and delay being variable, means to generate time and address digits, means to encipher said time and address digits, means to initially set the frequencies and delays in each of said transmitting channels, said setting means receiving said enciphered time and address digits, means to convert a message to be transmitted into digital bits, means to encipher said message digital bits, means for multiple transmission of the initial message digital bit after said initial setting of said transmitting channels, means to successively reset the frequency and time delay in each of said transmitting channels after said multiple transmission of said first message digital bit, said resetting means receiving said successive enciphered message digital bits, each of said message digital bits being transmitted in multiple upon each of said resettings until said message is completely transmitted.

3. A system of communications to an intended destination in a manner to elude detection by unauthorized sources, and to prevent jamming, which comprises multi-channel transmitting means, each of said channel transmitting means having a different frequency and delay, said frequency and delay being variable, means to generate time and address digits, means to encipher said time and address digits, means to initially set the frequencies and delays in each of said transmitting channels, said setting means receiving said enciphered time and address digits, means to convert a message to be transmitted into digital bits, means to encipher said message digital bits, means for multiple transmission of the initial message digital bit after said initial setting of said transmitting channels, means to successively reset the frequency and time delay in each of said transmitting channels after said multiple transmission of said first message digital bit, said resetting means receiving said successive enciphered message digital bits, each of said message digital bits being transmitted in multiple upon each of said resettings until said message is completely transmitted, multi-channel means to receive said multiple transmissions of digital bits, means to set and reset said receiving multi-channels in a manner corresponding to said transmitting channels, and means to synchronize in time said transmitting and said receiving means.

4. A system of communications to an intended destination in a manner to elude detection by unauthorized sources, and to prevent jamming, which comprises multi-channel transmitting means, each of said channel transmitting means having a different frequency and delay, said frequency and delay being variable, means to generate time and address digits, means to encipher said time and address digits, means to initially set the frequencies and delays in each of said transmitting channels, said setting means receiving sad enciphered time and address digits, means to convet a message to be transmitted into digital bits, means to encipher said message digital bits, means for multiple transmission of the initial message digital bit after said initial setting of said transmitting channels, means to successively reset the frequency and time delay in each of said transmitting channels after said multiple transmission of said first message digital bit, said resetting means receiving said successive enciphered message digital bits, each of said message digital bits being transmitted in multiple upon each of said resettings until said message is completely transmitted, multi-channel means to receive said multiple transmissions of digital bits, means to set and reset said receiving multi-channels in a manner corresponding to said transmitting channels, means to synchronize in time said transmitting and said receiving means, and means to re-establish communications between said transmitter and said receiver when a message is intercepted in the process of transmission, wherein said means includes a provision to initiate said uncompleted message from its very inception.

5. A system of communications to an intended destination in a manner to elude detection by unauthorized sources, and to prevent jamming, which comprises multi-channel transmitting means, each of said channel transmitting means having a different frequency and delay, said frequency and delay being variable, means to generate time and address digits, means to encipher said time and address digits, means to initially set the frequencies and delays in each of said transmitting channels, said setting means receiving said enciphered time and address digits, means to convert a message to be transmitted into digital bits, means for multiple transmission of the initial message digital bit after said initial setting of said transmitting channels, means to successively reset the frequency and delay in each of said transmitting channels after said multiple transmission of said first message digital bit, said resetting means receiving said successive said enciphered message digital bits, each of said message digital bits being transmitted in multiple upon each of said resettings until said message is completely transmitted, and multi-channel means for multiple transmission of dummy message digit bits simultaneously with said message digital bits.

6. A system of communications to an intended destination in a manner to elude detection by unauthorized sources, and to prevent jamming, which comprises multi-channel transmitting means, each of said channel transmitting means having a different frequency and delay, said frequency and delay being variable, means to generate time and address digits, means to encipher said time and address digits, means to initially set the frequencies and delays in each of said transmitting channels said setting means receiving said enciphered time and address digits, means to convert a message to be transmitted into digital bits, means to encipher said message digital bits, means for redundant transmission of the initial message digital bit after said initial setting of said transmitting channels, means to successively reset the frequency and time delay in each of said transmitting channels after said multiple transmission of said first message digital bit, said resetting means receiving said successive enciphered message digital bits, each of said message digital bits being transmitted in multiple upon each of said resettings until said message is completely transmitted, multi-channel means to receive transmissions of said message digital bits, means to set and reset said receiving channels in a manner corresponding to said transmitting channels, means to synchronize in time said transmitting and said receiving means, transmitting means located at said multi-channel receiving means to acknowledge receipt of a transmitted message, and means located at said transmitter to receive said acknowledgement transmission and thereupon initiate a message to some other intended destination.

* * * * *